United States Patent
Ashokan et al.

(10) Patent No.: US 9,590,916 B2
(45) Date of Patent: Mar. 7, 2017

(54) METHOD AND SYSTEM FOR DYNAMICALLY PRIORITIZING USER CONNECTIONS ON NETWORK

(71) Applicant: Aruba Networks, Inc., Sunnyvale, CA (US)

(72) Inventors: Kiran Ashokan, Sunnyvale, CA (US); Arun Kumar R., Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 298 days.

(21) Appl. No.: 14/018,145

(22) Filed: Sep. 4, 2013

(65) Prior Publication Data
US 2015/0067172 A1    Mar. 5, 2015

(51) Int. Cl.
| | |
|---|---|
| *G06F 15/173* | (2006.01) |
| *H04L 12/911* | (2013.01) |
| *H04L 12/863* | (2013.01) |
| *H04L 29/08* | (2006.01) |

(52) U.S. Cl.
CPC ........ *H04L 47/743* (2013.01); *H04L 47/6295* (2013.01); *H04L 47/745* (2013.01); *H04L 67/101* (2013.01); *H04L 67/306* (2013.01); *H04L 67/322* (2013.01)

(58) Field of Classification Search
CPC ..... H04L 47/74; H04L 47/743; H04L 47/745; H04L 47/72; H04L 47/805; H04L 47/6295
USPC .......................................... 709/225–226, 229
See application file for complete search history.

(56) References Cited

U.S. PATENT DOCUMENTS

| | | | | |
|---|---|---|---|---|
| 6,115,390 | A  * | 9/2000  | Chuah ................... | H04L 47/824 370/348 |
| 6,205,481 | B1 * | 3/2001  | Heddaya ............. | G06F 12/0813 707/E17.12 |
| 7,899,920 | B2 * | 3/2011  | Yanagi ................. | G06F 13/387 370/449 |
| 8,532,141 | B2 * | 9/2013  | Frank .................... | G01S 5/0252 370/235 |
| 2002/0057649 | A1 * | 5/2002  | Kinnunen .......... | H04L 12/5602 370/230 |
| 2005/0157690 | A1 * | 7/2005  | Frank .................. | H04W 88/085 370/338 |
| 2007/0047478 | A1 * | 3/2007  | Balachandran ....... | H04W 72/10 370/328 |
| 2008/0240142 | A1 * | 10/2008 | Belgaied ................. | H04L 49/90 370/420 |
| 2010/0111215 | A1 * | 5/2010  | Nandagopalan ..... | H04B 7/0617 375/267 |

(Continued)

*Primary Examiner* — Nam Tran
(74) *Attorney, Agent, or Firm* — Brooks, Cameron & Huebsch, PLLC

(57) ABSTRACT

The present disclosure discloses a method and network device for dynamically prioritizing user connections on network. The disclosed system identifies a priority class associated with a client device prior to an initial connection from the client device to a network, and reserves access to a network resource for the client device based on the priority class prior to the initial connection. Specifically, the system evaluates a total capacity of the network resource and an anticipated usage of the network resource by the client device associated with the priority level. Then, the system will reject requests for accessing the network resource received from other client devices prior to the client device associated with the priority level accesses the network resource.

21 Claims, 4 Drawing Sheets

(56) References Cited

U.S. PATENT DOCUMENTS

2014/0222889 A1* 8/2014 Bello ............... H04L 29/06537
 709/202

* cited by examiner

METHOD AND SYSTEM FOR DYNAMICALLY PRIORITIZING USER CONNECTIONS ON NETWORK

FIELD

The present disclosure relates to network resource access management. In particular, the present disclosure relates to a method and system for dynamically prioritizing user connections on a network.

BACKGROUND

In a wireless local area network (WLAN), a large number of users with different roles in the enterprise may want to access a finite or limited set of resources. For example, in a classroom on a campus, there may be one instructor and many students who need to access the network where there is only one access point (AP) located in or near the classroom providing network access. Thus, all of the students will connect to the same AP, which may potentially cause the instructor unable to connect to the network due to the user limits being reached by the AP. Sometimes, even if the instructor is able to connect to the AP in or near the classroom, because of the large number of users that are concurrently connected to the AP, the instructor will be suffering from poor network connectivity.

Some conventional mechanisms of network resource management provide for load balancing of clients across multiple access points based on the client capabilities or user roles associated with each client. Other solutions provide for ways of filtering network resources such that clients with different roles will have different views of the network resources based on network policies. However, there has been no known mechanism that dynamically prioritize user connections, which guarantees access to network resources from high priority users based on their roles.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to network resource access management, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to network-ing resource access management. In particular, the present disclosure relates to a method and system for dynamically prioritizing user connections on network. Specifically, the system first prioritizes user connections by identifying a set of high priority clients. Then, the system can determine a bandwidth reserved for the set of high priority clients based on a variety of factors, such as the access point's capacity, anticipated usage by the high priority clients, etc. Accordingly, the system will either reserve the bandwidth on the access point for the network usage by the set of high priority clients, or restrict the usage by other clients.

Computing Environment

Figure 1:
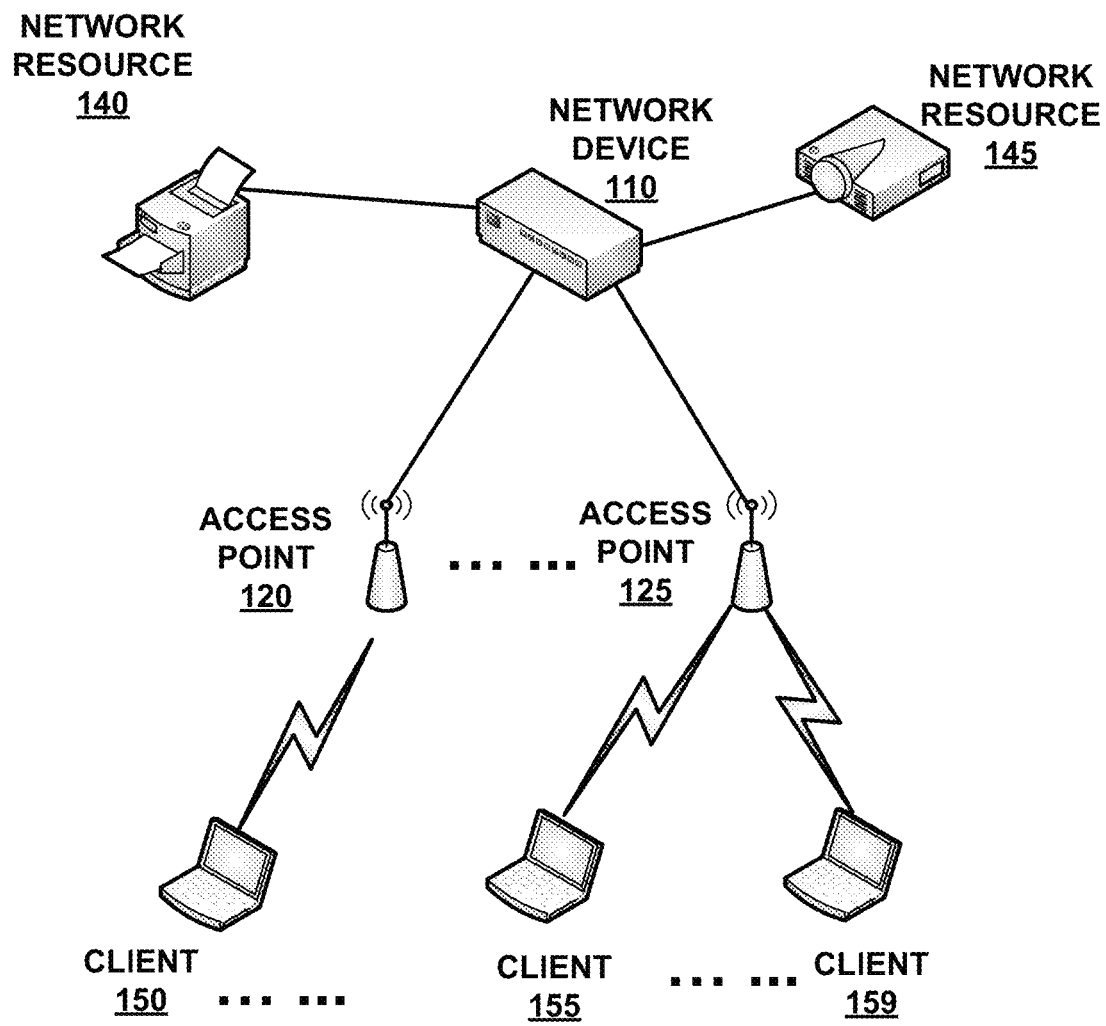
FIG. 1 illustrates an exemplary network computing environment according to embodiments of the present disclosure.

FIG. 1 illustrates a network computing environment according to embodiments of the present disclosure. The disclosed system includes a network device 110, a plurality of network resources, such as network resource 140 (network printer) and network resource 145 (network projector), a plurality of access points such as access point 120 and access point 125, and a plurality of client devices such as client 150, client 155, . . . , client 159, etc.

A network controller, such as network device 100, is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

Moreover, assuming that a number of access points, such as access point 120, access point 125, etc., are interconnected with network device 100. Each access point 120 or 125 may be interconnected with zero or more client devices via either a wired interface or a wireless interface. In this example, for illustration purposes only, assuming that the client 150 is associated with the access point 120 via a wireless link. An access point 120 or 125 generally refers to a network device that allows wireless clients to connect to a wired network. Access points 120 or 125 usually connect to a controller device, such as network device 100, via a wired network or can be a part of network device 100 in itself. For example, the access point 120 or 125 may be connected to network device 100 via an optional layer 2 or layer 3 network.

Furthermore, the network device 100 can be connected to a router (not shown) through zero or more hops in a layer 3 or layer 2 network. The router can forward traffic to and receive traffic from the Internet. The router generally is a network device that forwards data packets between different networks, and thus creating an overlay internetwork. A router is typically connected to two or more data lines from different networks. When a data packet comes in one of the data lines, the router reads the address information in the packet to determine its destination. Then, using information in its routing table or routing policy, the router directs the packet to the next/different network. A data packet is typically forwarded from one router to another router through the Internet until the packet gets to its destination.

A client device, such as client 150, client 155, . . . , or client 159, may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only a few clients are illustrated in FIG. 1, a plurality of clients can be included in such network computing environment.

Note that, in a typical deployment scenario, the number of network resources, such as access points, printers, projectors, scanners, etc., often is limited. On the other hand, the total number of clients supported by a network controller, such as network device 110, increases as the technology improves. Thus, it is important to prioritizing the large number of clients while managing the limited network resources.

For example, in a campus classroom environment with only one access point (AP) deployed in the area, there may be 50 students and 1 instructor all of whom will be attempting to connect to the same AP at the same time. Sometimes, the instructor may not be able to connect because of the user limit on the AP has been reached. Other times, even if the instructor is able to connect to the AP, he may not be able to use the network due to poor quality of connection. On the other hand, the instructor needs to be given a higher priority while accessing network resources, because, hypothetically, if the instructor cannot connect to the network, the class presentation may not be able to proceed, and thus all of the 50 students will suffer from the consequence of the instructor's inability to connect to the AP.

As another example, web conferences or webinars have become exceedingly popular nowadays. If a host of a webinar cannot connect to the network, then the conference would not be able to proceed properly. Thus, the host of the webinar in this scenario would need to be assigned a higher priority than other users.

Therefore, where there is a finite or limited network resource set that cannot support all of the users who wish to consume the network resource set, conventionally, there lacks a mechanism for providing a subset of users with a specific priority classification to gain a differentiated level of access to the network resource set from other users without such priority classification or with a different priority classification. Specifically, the finite or limited network resource set may include association with an access point, allocation of a fair amount of airtime by the access point, usage bandwidth, access to certain network devices (e.g., a network printer, projector, etc.), and so on.

Conventionally, the network can balance a plurality of clients across multiple APs on either a fair access or preferred access basis. In fair access balancing scheme, all network users will receive equal amount of airtime. With fair access, every user device will be allocated equal bandwidth.

In preferred access balancing scheme, client devices with higher capabilities receive preferred access to network resources. For example, if a client is capable of communicating on dual bands, the client will be eligible for preferred access to the network resources. On the other hand, legacy clients will not be able to get the preferred access to the network resources.

Accordingly, in these conventional schemes, the differentiated access is only given based on client device capabilities, and does not take into account of the identity of the user who has been authenticated to use the client device.

Alternatively, a user may be assigned a role, for example, an instructor role or a student role. In addition, each role is associated with a number of devices. The discovery of network resources by the user may be restricted by the role assigned to the user. For example, only users who are assigned with an instructor role may discover the existence of a network resource located in the classroom, e.g., a network TV device. Because other users who are not assigned with the specific role will not discover the network resource, their usage of such network resource is thus restricted. Nevertheless, the restriction can only be performed on a per-role basis. It is difficult to enforce network resource restriction on a per-user basis. Thus, when multiple users of the same role need to access the same network resources, there needs to be a mechanism to prioritize the multiple users.

The mechanism disclosed herein involves three basic elements: (1) identifying client devices, (2) caching the device information with designated priority, and (3) providing high availability of network service to the identified client devices or the client devices designated with high priority.

Client Device Identification or Prioritization

According to embodiments of the present disclosure, each client device in a network is assigned with a level of priority. For simplicity of illustration, assuming that each client device with a unique Media Access Control (MAC) address is assigned either a high priority or a low priority. To identify high priority devices, a network administrator may configure on a static basis that a set of known MAC addresses (e.g., the MAC addresses of devices that owned by an instructor) to be assigned high priority. Alternatively, the network administrator may configure a set of network policies to facilitate identification of high priority users. Note that, multiple levels of priorities may be configured. Moreover, a priority level may include multiple sub-levels.

Figure 2:
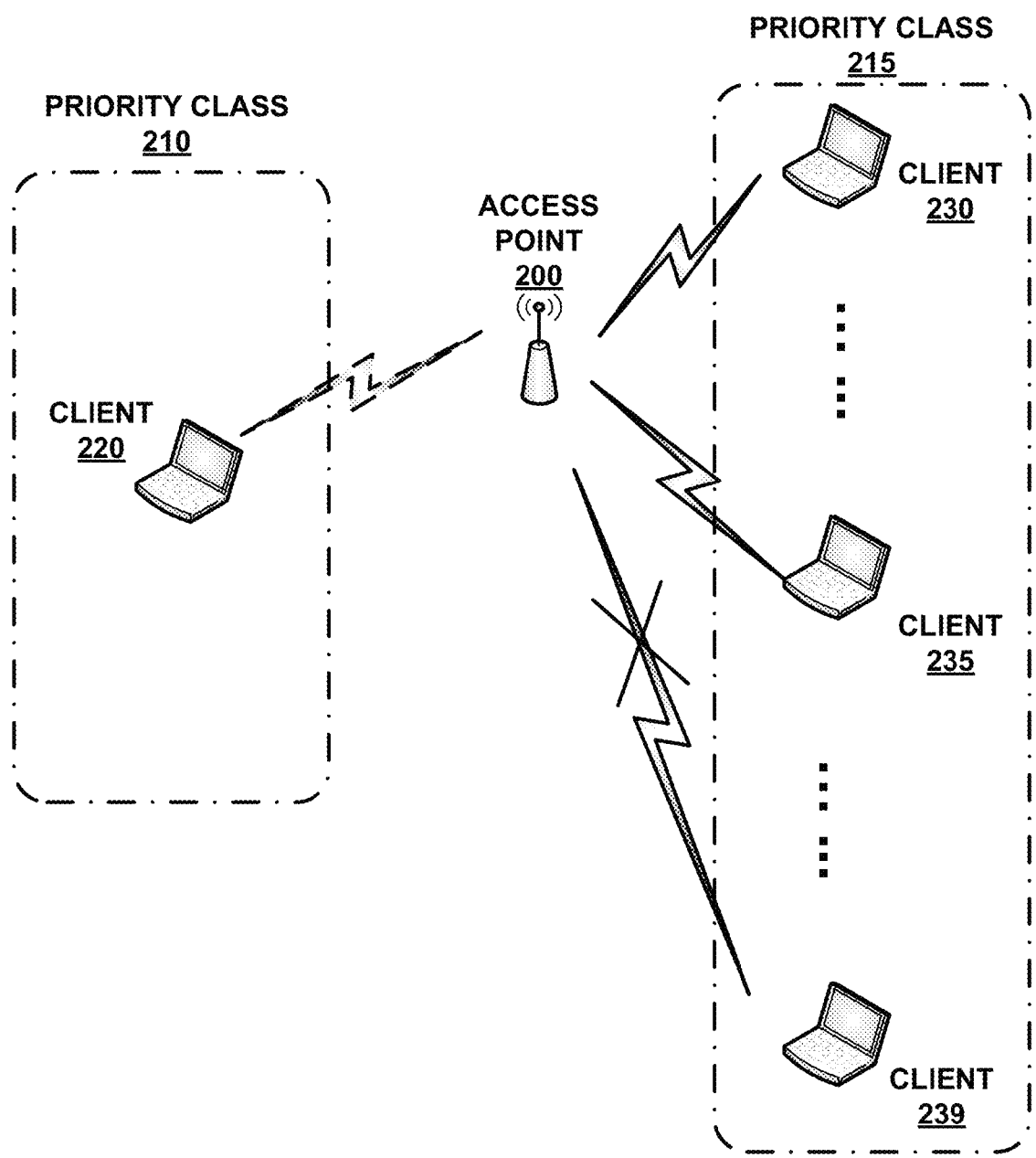
FIG. 2 is a diagram illustrating exemplary network resource access reserved for high priority users according to embodiments of the present disclosure.

FIG. 2 is a diagram illustrating network user prioritization. FIG. 2 includes at least a network resource such as an access point 200, two or more priority classes such as priority class 210 and priority class 215, and a number of client devices such as client 220, client 230, client 235, . . . client 239, etc. Specifically, in the example illustrated in FIG. 2, client 220 is assigned to priority class 210 (e.g., a high priority class). Moreover, clients 230-239 are assigned to priority class 215 (e.g., a low priority class).

In the exemplary scenario of network resource access in a classroom, client 220 may be a client device associated with a user who is an instructor. Clients 230-239 may be client devices associated with users who are students. In addition, priority class 215 may be divided into multiple sub-classes (not shown). For example, client devices owned by visiting students may be given a lower priority than those client devices that are owned by regular students. In some embodiments, client devices may be classified into multiple priority classes, e.g., a high priority class, a regular priority class, and a guest priority class.

The priority may be assigned based on a number of factors, including but not limited to, the network policy, the role of the user, the nature of the network resources, the capability of the client device, etc. The priority for each client device can be identified statically or dynamically.

Memory storage on the network can maintain a mapping between client device identifiers (e.g., MAC addresses) and designated priorities, and share the mapping with network devices in the network.

Moreover, the priority may be assigned based on a network policy. For example, client devices of the users who are instructors are assigned to high priority. Thus, the first time when an instructor connects to an access point in the network with his laptop computer, the MAC address of the instructor's laptop computer is recorded and the laptop computer is designated as high priority. As a result, an entry that includes the MAC address of the instructor's laptop computer and a high priority class designation is added to the memory storage or a cache.

Since device association is typically a first-in first-out (FIFO) event at the access point (AP) regardless of whether it is a new association or a roaming client previously associated with another AP, client devices in a WLAN can be designated to at least two priority classifications—high availability (HA) devices and non-HA devices. HA devices, for example, would be identified based on certain rules configured by the administrator. Note that, a client device may be designated as an HA device according to network policies or rules that are based on one or more of a user role, a device type, an identifier of the device (e.g., a MAC address), an Extended Service Set Identification (ESSID), and/or a combination of the above. Specifically, all devices from a CEO and/or a presenter of a meeting may be identified as HA devices.

As another example, all devices from a CEO and/or a presenter of a meeting are identified by certain device characteristics, such as Dynamic Host Configuration Protocol (DHCP) or Hypertext Transfer Protocol (HTTP) signatures. With proper device characteristic identified, when the same user has multiple different types of devices, e.g., an iPad device, a laptop device, a smartphone device, etc., it is possible for one particular device from the user to be designated as an HA device, whereas the other devices from the same users are non-HA devices.

Users could be added statically so that the initial association from a user can also benefit from prioritized access to network resources. This is because, without static predetermined client priority configuration, the user would need to connect at least once to the network in order to be added to the storage or cache of HA devices. However, static client priority configuration facilitates enforcing device priority level during the very first association between the device and any access point in the network.

Moreover, in some embodiments, the cache entries can be populated across to all access points in the network, such that when the device later roams to a different access point in the network, its priority level will be identified and preserved seamlessly during the roaming process.

Cache of Device Priority Information

The system disclosed herein also cache device priority information, which includes but is not limited to, the device's MAC address, the user's login credentials (e.g., user names), and/or any other related parameters, such as ESSID, VLAN, etc. The device priority information is used to provide device HA functions, such as, prioritized association handling, reservation of Wireless Multimedia Extension (WMM) and/or AP radio queues, dynamically prioritizing traffic in higher queues, and so forth. In some embodiments, this cache information may be stored in a database on a network device, such as a network controller, to be persistent across network device reboots.

According to some embodiments, when the APs and the controller boot up, the device priority information in the cache database is pushed to all network devices in the WLAN. Also, whenever a new entry is added, the database is updated; and, the updated information is pushed to all network devices as well.

In some embodiments where a fixed limit is enforced on the device count (e.g., 100 device entries), an AP in the network may be able to accept associations from HA device clients even beyond the maximum association limit for the AP. Specifically, when AP receives an association request, if AP has already reached its maximum association limit, the AP will check the cache table to determine whether the new client's MAC address exists in the table. If the client's MAC address is present in the cache table and the maximum limit of high availability devices has not been reached on the AP, the association is accepted. On the other hand, if the client MAC address is not present in the cache table or if the maximum association limit for the high availability devices already has been reached on the AP, the association is rejected.

The cache entries are also dynamically updated or deleted. For example, the cache entry can be cleared dynamically if some of the parameters used to determine priorities are changed. For instance, if user name changes, the disclosed system may decide to drop the devices from the cache list that stores device priority information for HA devices.

Network Resource Access for Prioritized Users

In order to guarantee network resource access by prioritized users, a system according to embodiments of the present disclosure can evaluate the capacity of the network resource, for example, by estimating the total bandwidth that an access point supports. In addition, the system also evaluates the anticipated usage by users from a specific priority class, e.g., by estimating the bandwidth that high priority users of a network will need. Then, the system can reserve a portion of the network resource usage for the users of the specific priority class prior to those users' actual access to the network resources.

For example, assuming that an access point can support up to 50 concurrent clients, and that there are a total of 5 clients designated to the high priority class. Thus, the access point may be configured to reserve 10% of its bandwidth for client devices of the high priority class. Accordingly, the access point will only accept connection requests from up to 45 clients of a non-high priority class and reserve its capacity to be connected by 5 additional clients to those clients of the high priority class.

In FIG. 2, assuming that priority class 210 is a high priority class and that priority class 215 is a low priority class. Initially, clients 230-235 from priority class 215 has been connected to access point 200. Nevertheless, it is known that client 220 of priority class 210 will need to be connected to access point 200. Moreover, access point 200 has the capacity to support only one additional client besides clients 230-225 that are already connected to access point 200. Assuming that, a low priority client such as client 239 from priority class 215 attempts to connect to access point 200 now. Although access point 200 has the capacity to support one additional client, access point 200 with nevertheless reject the connection requests from client 239 of priority class 215, because the additional client connection capacity has been reserved for client 220 from priority class 210. Subsequently, when client 220 tries to connect to access point 200, access point 200 will accept the connection request after ascertaining that client 220 is designated with the appropriate priority class, e.g., priority class 210.

Note that, other network resources may be reserved for high priority users in the same fashion. In the context of WLAN, airtime generally refers to the amount of time for which actual transmissions of frames occur between a wireless client and the access point that it associates with. For example, the access point may be configured to reserve 40% of its airtime for client devices of the high priority class. Therefore, if there are 20 client devices of low priority and 1 client device of high priority connected to the access point, the access point will be allocating 3% of its airtime to each client device of the low priority and 40% of its airtime to the client device of the high priority.

As another example, the disclosed system may reserve certain network service features for clients of a specific priority class. Specifically, key cache entries are generally used to offload hardware cryptographic functionalities for improved security performance. A system in accordance to embodiments of the present disclosure may reserve a number of such key cache entries.

In yet another example, the disclosed system may reserve a number of beamforming entries for clients of a specific priority class. Specifically, beamforming technique generally combines elements in a phased array so that signals at particular angles, at which a specific client is located, experience constructive interference while others experience destructive interference. Beamforming can be used at both the transmitting and receiving ends in order to achieve spatial selectivity that effectively boosts signal strengths for certain selected client devices. Beamforming entries are maintained at a network device, such as a network controller, to determine which clients will benefit from the signal boosts from being the target of beamforming, e.g., from multiple access points in the area. An access point may be capable of supporting up to 100 clients. However, the beamforming feature can be applied to only a small subset of those clients. Therefore, by reserving beamforming entries for the client devices of high priority class, the system also reserves the access to selected features only for the client devices of a specific priority class.

Furthermore, besides reserving a certain amount of network resources or a certain network service feature for clients of a specific priority class, the disclosed system can also restrict the amount of network resource or selected network service usage by other clients of different priority classes.

Processes for Dynamically Prioritizing User Connection in a Network

Figure 3A:
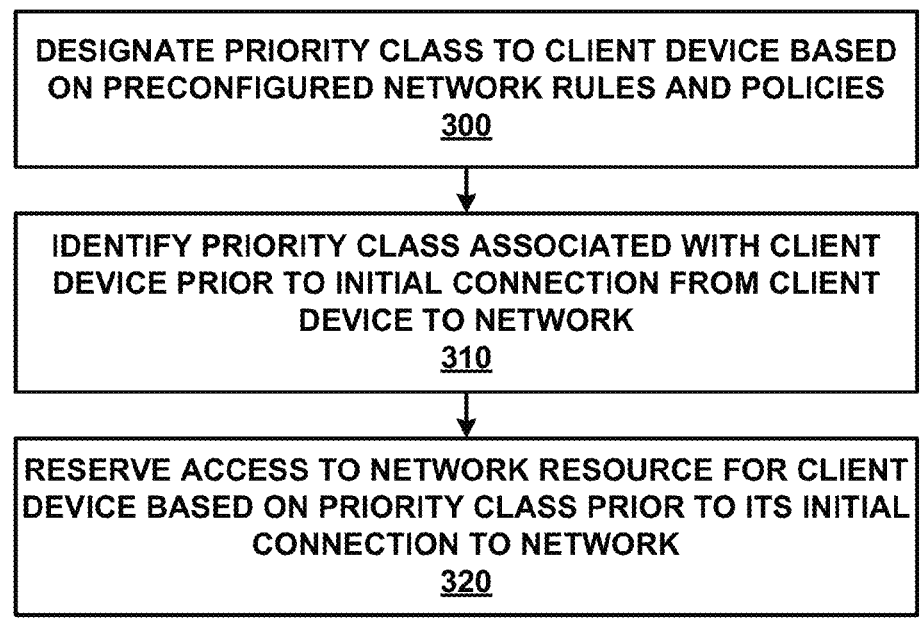
FIGS. 3A-3B are flowcharts illustrating exemplary processes for dynamically prioritizing user connections on network according to embodiments of the present disclosure.
Figure 3B:
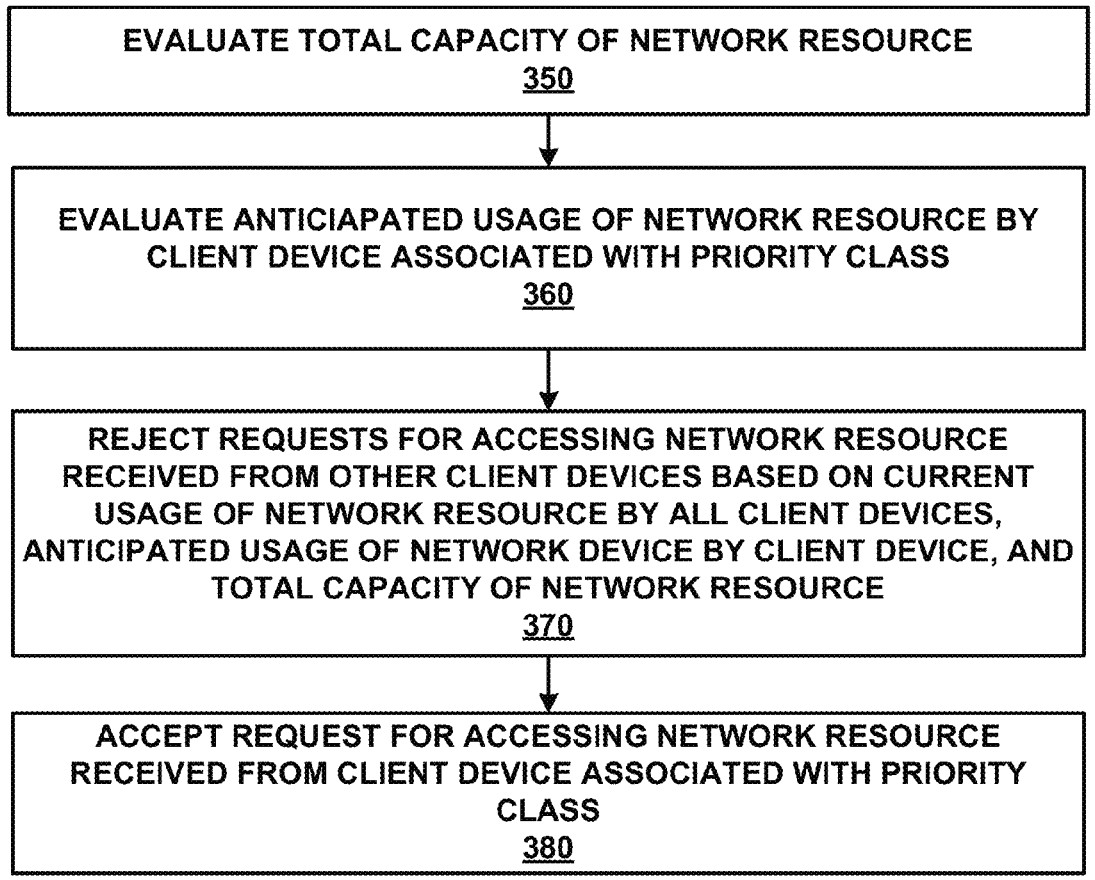

FIGS. 3A and 3B are flowcharts illustrating exemplary processes for captive portal user authentication. As illustrated in FIG. 3A, during operations, the disclosed system designate a priority class to a client device based on pre-configured network rules and policies (operation 300). The network rules and/or policies may be based on one or more of a user role, a device type, a MAC address of the client device, and an Extended Service Set Identification (ESSID), etc.

The disclosed system can further cache device priority information in a cache. Also, the disclosed system can update the device priority information, and exchange updated device priority information with other network devices in the network to maintain consistency and easy accessibility of the device priority information. Specifically, the cache maintains a mapping between client device identifiers of a plurality of client devices and designated priority classes associated with the plurality of client devices. Note that, the device priority information provides functions, such as, prioritized wireless network association handling, prioritized reservation of Wireless Multimedia Extension (WMM), prioritized reservation of access point radio queues, dynamically prioritized traffic in higher queues, prioritized airtime usage of the network device, prioritized access to network service features, etc. Prioritized access to network service features includes, but is not limited to, prioritized access to key cache entries for offloading hardware cryptographic functionalities at the network device, prioritized access to beamforming entries for directing beamforming activities from multiple network devices to targeted client devices.

Also, the disclosed system identifies the priority class associated with the client device prior to an initial connection from the client device to the network (operation 310). The system will then reserve access to network resource for the client device based on priority class prior to its initial connection to network (operation 320).

More specifically, as illustrated in FIG. 3B, the disclosed system may reserve access to network resource by evaluating total capacity of the network resource (operation 350). In addition, the disclosed system also evaluates anticipated usage of network resource by the client device associated with the priority class (operation 360).

Furthermore, the disclosed system will reject requests for accessing network resource received from other client devices based on current usage of network resource by all client devices, anticipated usage of network device by the client device, and total capacity of the network resource (operation 370). For example, the requests are rejected if the difference between the total capacity and the sum of (i) the current usage and (iI) the anticipated usage of the network resource is insufficient for accommodating accesses to the network resource from the other network devices. Alternatively, the system may start to restrict usage of the network resource by client devices which have been granted access in response to the difference between the total capacity and the sum of (i) the current usage and (ii) the anticipated usage of the network resource is near zero.

Moreover, the disclosed system will accept request for accessing network resource received from the client device associated with the priority class after the client device initiates the connection to the network (operation 380). Note that, the disclosed system will do so even when the current usage of the network resource and the total capacity of the network resource remain unchanged.

System for Dynamically Prioritizing User Connection in a Network

Figure 4:
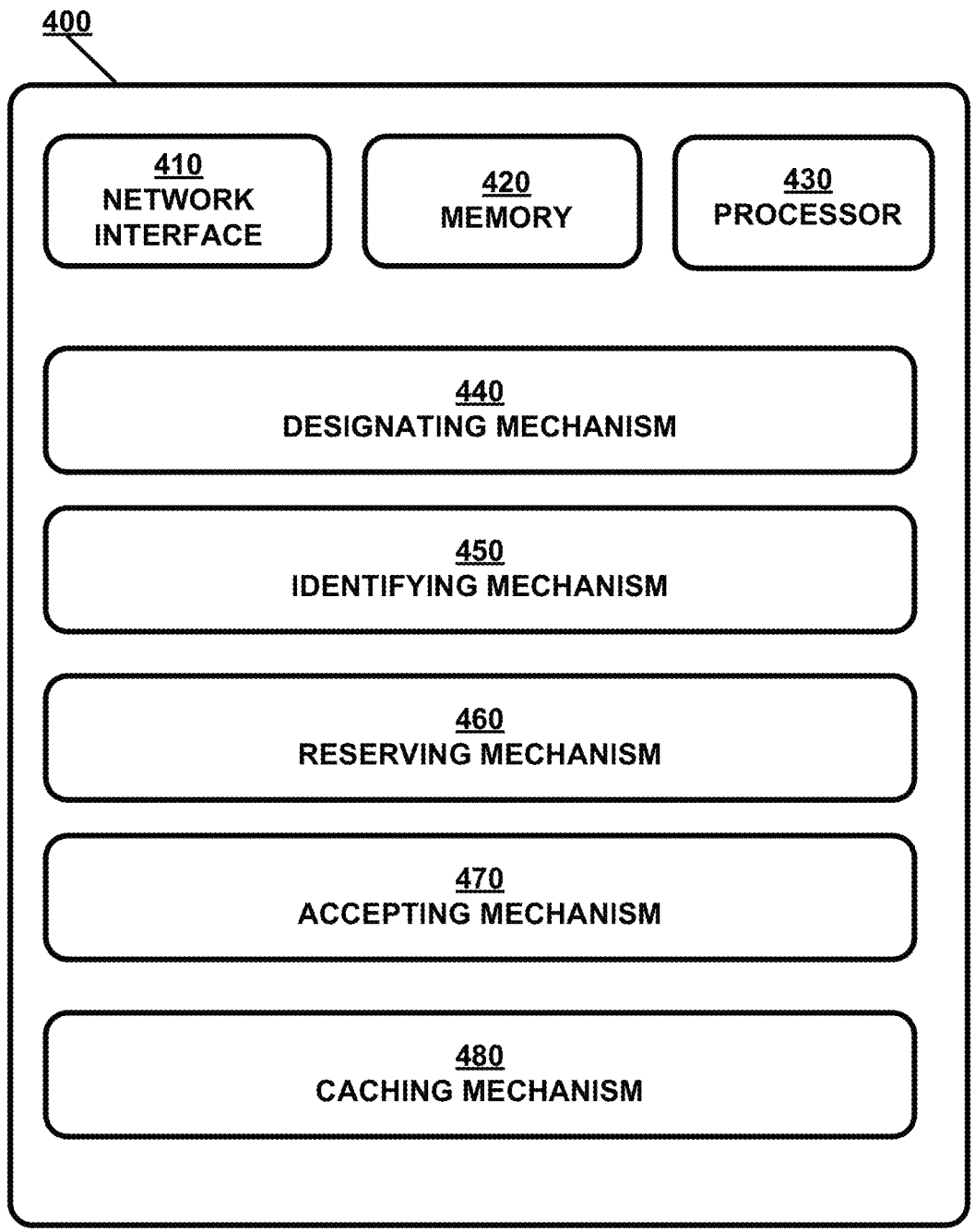
FIG. 4 is a block diagram illustrating an exemplary system for dynamically prioritizing user connections on network according to embodiments of the present disclosure.

FIG. 4 is a block diagram illustrating a network device system for dynamically prioritizing user connection in a network according to embodiments of the present disclosure. Network device 400 includes at least a network interface 410 capable of communicating to a wired network, a memory 420 capable of storing data, a processor 430 capable of processing network data packets, and a number of mechanisms coupled to the processor 430. The mechanisms include, but are not limited to, a designating mechanism 440, an identifying mechanism 450, a reserving mechanism 460, an accepting mechanism 470, a caching mechanism 480, etc. Note that, network device 400 may be used as a network switch, network router, network controller, network server, etc. Furthermore, network device 400 may serve as a node in a distributed or a cloud computing environment.

Network interface 410 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 410 may be software-defined and programmable, for example, via an Application Programming Interface (API), and thus allowing for remote control of the network device 400.

Memory 420 can include storage components, such as, Dynamic Random Access Memory (DRAM), Static Random Access Memory (SRAM), etc. In some embodiments, memory 420 includes a cache for storing device priority information according to embodiments of the present disclosure.

Processor 430 typically includes a networking processor that is capable of processing network data traffic. In some embodiments, processor 530 may include multiple processing cores and/or ASICs.

Designating mechanism 440 generally designates device priority information, e.g., a priority class. For example, designating mechanism 440 can designate a priority class to a client device based on one or more of pre-configured network rules and network policies. Note that, the pre-configured network rules and network policies are based on, for example, a user role, a device type, a MAC address of the client device, an Extended Service Set Identification (ES-SID), etc.

Identifying mechanism 450 generally identifies device priority information. For example, identifying mechanism 450 can identify a priority class associated with a client device prior to an initial connection from the client device to the network.

Reserving mechanism 460 generally reserves a network resource. For example, reserving mechanism 460 reserves access to a network resource for the client device based on the priority class prior to the initial connection from the client device to the network. Moreover, reserving mechanism 460 also evaluates a total capacity of the network resource, and an anticipated usage of the network resource by the client device associated with the priority class.

Furthermore, reserving mechanism 460 can reject requests for accessing the network resource received from other client devices prior to the client device associated with the priority class accesses the network resource based on a current usage of the network resource by all client devices, the anticipated usage of the network device by the client device associated with the priority class, and the total capacity of the network resource. For example, reserving mechanism 460 rejects requests from other client devices if the difference between the total capacity and the sum of (i) the current usage and (ii) the anticipated usage of the network resource is insufficient for accommodating accesses to the network resource from the other network devices.

In addition, reserving mechanism 460 can restrict usage of the network resource by client devices which have been granted access in response to the difference between the total capacity and the sum of (i) the current usage and (ii) the anticipated usage of the network resource is near zero.

Accepting mechanism 470 generally accepts requests for accessing network resources. For example, accepting mechanism 470 can accept a request for accessing the network resource by the client device associated with the priority class after the client initiates the connection to the network. Note that, the request is accepted after the requests from the other client devices are rejected even though the total capacity, the current usage, and the anticipated usage remain unchanged.

Caching mechanism 480 generally caches device information. For example, caching mechanism 480 can cache device priority information in a cache, update the device priority information, and exchange the updated device priority information with other network devices in the network.

According to embodiments of the present disclosure, network services provided by network device 400, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   designating a priority class associated with a client device based on pre-configured network rules and network policies, wherein the pre-configured network rules and network policies are based on a MAC address of the client device;
   identifying, by a network device in a network, the priority class associated with the client device prior to an initial connection from the client device to the network; and
   reserving, by the network device, prior to the initial connection from the client device to the network, access to a network resource for the client device by:
   evaluating a total capacity of the network resource;
   evaluating an anticipated usage of the network resource by the client device associated with the priority class prior to the initial connection from the client device to the network; and
   rejecting requests for accessing the network resource received from other client devices prior to the client device associated with the priority class accessing the network resource based on a current usage of the network resource by all client devices, the anticipated usage of the network device by the client device associated with the priority class, and the total capacity of the network resource; and
   accepting a request for accessing the network resource by the client device associated with the priority class after the client device initiates the connection to the network, wherein the request is accepted after the requests from the other client devices are rejected while the total capacity, the current usage, and the anticipated usage remain unchanged.

2. The method of claim 1, wherein rejecting the requests further comprises rejecting the requests in response to the difference between the total capacity and the sum of (i) the current usage and (ii) the anticipated usage of the network resource is insufficient for accommodating accesses to the network resource from the other network devices.

3. The method of claim 2, further comprising:
   restricting usage of the network resource by client devices which have been granted access in response to the difference between the total capacity and the sum of (i) the current usage and (ii) the anticipated usage of the network resource being near zero.

4. The method of claim 1, wherein the network resource comprises one or more of airtime usage of the network device and network service features.

5. The method of claim 4, wherein the network service features further comprise key cache entries for offloading hardware cryptographic functionalities at the network device.

6. The method of claim 4, wherein the network service features further comprise beamforming entries for directing beamforming activities from multiple network devices to targeted client devices.

7. The method of claim 1, further comprising:
   caching, by the network device, device priority information in a cache;
   updating, by the network device, the device priority information; and
   exchanging, by the network device, the updated device priority information with other network devices in the network.

8. The method of claim 7, wherein the cache maintains a mapping between client device identifiers of a plurality of client devices and designated priority classes associated with the plurality of client devices.

9. The method of claim 7, wherein the device priority information provides one or more of prioritized wireless network association handling, prioritized reservation of Wireless Multimedia Extension (WMM), prioritized reservation of access point radio queues, dynamically prioritized traffic in higher queues.

10. The method of claim 1,
    wherein the pre-configured network rules and network policies are based on the MAC address and one or more of:
    a user role,
    a device type, and
    an Extended Service Set Identification (ESSID).

11. A network device comprising:
a processor;
a network interface to receive one or more data packets;
a memory on which is stored instructions that are to cause the processor to:
designate a priority class associated with a client device based on pre-configured network rules and network policies; wherein the pre-configured network rules and network policies are based on an Extended Service Set Identification (ESSID);
identify the priority class prior to an initial connection from the client device to the network,
determine whether the identified priority class is a high priority class;
in response to the identified priority class being a high priority class, reserve access to a network resource for the client device prior to the initial connection from the client device to the network by:
evaluating a total capacity of the network resource; and
evaluating an anticipated usage of the network resource by the client device associated with the priority class prior to the initial connection from the client device to the network;
reject requests for accessing the network resource received from other client devices prior to the client device associated with the priority class accessing the network resource in response to a current usage of the network resource by all client devices and the anticipated usage of the network device by the client device associated with the priority class equaling or exceeding the total capacity of the network resource; and
accept a request for accessing the network resource by the client device associated with the priority class after the client device initiates the connection to the network, wherein the request is accepted after the requests from the other client devices are rejected while the total capacity, the current usage, and the anticipated usage remain unchanged.

12. The network device of claim 11, wherein the instructions are to cause the processor to reject the requests for accessing the network resource received from other client devices in response to a difference between the total capacity of the network resource and the sum of (i) the current usage and (ii) the anticipated usage of the network device by the client device associated with the priority class being insufficient for accommodating accesses to the network resource from the other network devices.

13. The network device of claim 12, wherein the instructions are further to cause the processor to:
restrict usage of the network resource by client devices which have been granted access in response to the difference between the total capacity and the sum of (i) the current usage and (ii) the anticipated usage of the network resource being near zero.

14. The network device of claim 13, wherein the network resource comprises one or more of airtime usage of the network device and network service features.

15. The network device of claim 14, wherein the network service features further comprise key cache entries for offloading hardware cryptographic functionalities at the network device.

16. The network device of claim 14, wherein the network service features further comprise beamforming entries for directing beamforming activities from multiple network devices to targeted client devices.

17. The network device of claim 13, wherein the instructions are further to cause the processor to:
cache device priority information in a cache,
update the device priority information, and
exchange the updated device priority information with other network devices in the network.

18. The network device of claim 17, wherein the cache maintains a mapping between client device identifiers of a plurality of client devices and designated priority classes associated with the plurality of client devices.

19. The network device of claim 17, wherein the device priority information provides one or more of prioritized wireless network association handling, prioritized reservation of Wireless Multimedia Extension (WMM), prioritized reservation of access point radio queues, dynamically prioritized traffic in higher queues.

20. The network device of claim 13, wherein the pre-configured network rules and network policies are based on the ESSID and one or more of:
a user role,
a device type, and
a MAC address of the client device.

21. A non-transitory computer-readable storage medium storing embedded instructions for a plurality of operations that when executed by a processor of a network device, cause the processor to:
designate a priority level associated with a client device based on pre-configured network rules and network policies, wherein the pre-configured network rues and network policies are based on an Extended Service Set Identification (ESSID);
identify the priority level prior to an initial connection from the client device to a network;
determine whether the identified priority level is a high priority level; and
in response to the identified priority level being a high priority level, reserve access to a network resource for the client device prior to the initial connection by:
evaluating a total capacity of the network resource;
evaluating an anticipated usage of the network resource by the client device associated with the priority level prior to the initial connection from the client device to the network; and
rejecting requests for accessing the network resource received from other client devices prior to the client device associated with the priority level accessing the network resource based on a current usage of the network resource by all client devices, the anticipated usage of the network device by the client device associated with the priority level, and the total capacity of the network resource; and
accepting a request for accessing the network resource by the client device associated with the priority class after the client device initiates the connection to the network, wherein the request is accepted after the requests from the other client devices are rejected while the total capacity, the current usage, and the anticipated usage remain unchanged.

* * * * *